United States Patent Office 3,124,559
Patented Mar. 10, 1964

3,124,559
POLYMERS FROM DIALDEHYDES AND DIHYDRAZIDES
Hobson D. De Witt, New Wilmington, Pa., assignor, by mesne assignments, to Monsanto Chemical Company, a corporation of Delaware
No Drawing. Filed June 22, 1960, Ser. No. 37,846
15 Claims. (Cl. 260—72)

This invention relates to new synthetic linear polymers and a method for preparing them. More particularly it relates to polymers formed by the reaction of dihydrazide derivatives of dibasic acids with dialdehydes.

The preparation of condensation products of certain dihydrazides, aldehydes and alcohols is well known in the art. Dihydrazides of dicarboxylic acids have been reacted with hydrazine at 200–300° C. to give fiber-forming polymers having a polydihydrotetrazine structure such as

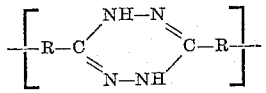

It is an object of this invention to provide a new type of synthetic linear polymer. Another object is the preparation of new linear polyhydrazones by the reaction of dihydrazide derivatives of dibasic acids with dialdehydes. Other objects and advantages of the invention will be apparent from the description thereof hereinafter.

In general, the objects of the instant invention are accomplished by preparing the new synthetic linear polyhydrazone from dialdehydes and dihydrazides.

The new synthetic linear polyhydrazones of the present invention have as the recurring structural unit

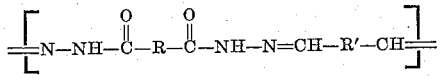

wherein R is a divalent hydrocarbon radical containing from 2 to 12 carbon atoms, and R' is a divalent hydrocarbon radical containing from 0 to 12 carbon atoms. As examples of such polymers there may be mentioned the polycondensation products obtained from the polymerization of oxalic dihydrazide and glyoxal, malonic dihydrazide and malonaldehyde, succinic dihydrazide and succinaldehyde, succinic dihydrazide and glyoxal, glutaric dihydrazide and adipaldehyde, adipic dihydrazide and pimelaldehyde, suberic dihydrazide and azelaldehyde, sebacic dihydrazide and terephthalaldehyde, sebacic dihydrazide and glutaraldehyde, brassic dihydrazide and isophthalaldehyde and the like.

The dihydrazides of dicarboxylic acids used in the practice of this invention have the hydrazide groups attached to aliphatic carbons and are prepared in a manner well known in the art. Some examples that may be mentioned include oxalic dihydrazide, malonic dihydrazide, succinic dihydrazide, glutaric dihydrazide, adipic dihydrazide, pimelic dihydrazide, suberic dihydrazide, azelaic dihydrazide, sebacic dihydrazide, and brassic dihydrazide. It is to be understood that the invention is not, however, confined to the use of dihydrazides of dicarboxylic acids in which the hydrazide groups are linked by unsubstituted polymethylene chains. These groups may be linked as well by polymethylene chains containing substituents which are not reactive with the reactants used. Examples of dihydrazides of dicarboxylic acids containing such chains are 1,3-dimethyl glutaric dihydrazide, 2-methyl-adipic dihydrazide, 1,1-dimethyl-adipic dihydrazide, 2,2-dimethyl-adipic dihydrazide, 3-methoxy-adipic dihydrazide and the like.

The dialdehydes of the instant invention may be prepared by well known methods. These dialdehydes may be aromatic or aliphatic, contain nonreactive substituents and contain up to 12 carbon atoms in the monomeric chain. Some examples that may be mentioned include glyoxal, malonaldehyde, succinaldehyde, glutaraldehyde, adipaldehyde, pimelaldehyde, suberaldehyde, azelaldehyde, sebacaldehyde, terephthalaldehyde, isophthalaldehyde, phthalaldehyde, 5-methyl-isophthalaldehyde and the like.

In the preferred practice of this invention the dihydrazides are dissolved in a suitable solvent such as alcohol, glycol, ketone, and the like, with some warming necessary to effect solution. To the heated solution the dialdehyde dissolved in a suitable solvent, such as alcohol, glycol, ketone, and the like, is added. The polymerization process must be aided by the use of small amounts of an acid catalyst such as acetic acid, propionic acid, butyric acid, and the like. The amount of catalyst will vary with the molecular weight of the polymer, usually from about 0.5 to 5.0 ml. The polymerization reaction begins immediately upon the contact of the dialdehyde with the dihydrazide and is usually completed within 5 to 10 minutes. The polycondensation reaction can be effected at slightly elevated temperatures, from 30 to 50° C. The method of preparing the polymers may include mass polymerization, solution polymerization, or suspension polymerization which are conducted in the conventional manner. The polycondensation may be conducted in batch lots, by continuous methods, or by semi-continuous methods. It is usually desirable for purposes of forming fibers and the like to continue the polycondensation reaction until a polymer having a molecular weight of at least 10,000 and desirably at least 25,000 is attained, the molecular weight being determined by measuring the viscosity of dilute solutions in a manner well known in the art. For purposes of coatings, lacquers, paints, and films lower molecular weights polymers can be employed. The polymers of this invention may contain from 50 to 80 percent dihydrazide based on the total weight of the dihydrazide dialdehyde polymer. From 60 to 70 percent by weight of dihydrazide is preferred.

The following examples are intended to illustrate the new compositions of this invention more fully but are not intended as limitative, as many widely varying modifications thereof are possible. In the examples all parts and percents are by weight unless otherwise indicated.

Example I 2.30 grams of sebacic dihydrazide were dissolved in 300 ml. of 70 percent ethanol. The mixture had to be warmed to effect solution. To the hot solution of sebacic dihydrazide there was then added 1.0 gram of glutaraldehyde in about 20 ml. of 70 percent ethanol. Three drops of glacial acetic acid was added as a catalyst. A white polymer precipitate formed which was filtered, washed and dried. The polymer had a melting point of 180–5° C. and crude fibers could be drawn from the melt.

Example II 2.30 grams of sebacic dihydrazide were dissolved with heat in 350 ml. of ethanol. 1.34 grams of warmed terephthalaldehyde dissolved in 10 ml. ethanol were added to the hot solution of sebacic dihydrazide. 3 ml. of glacial acetic acid were added as a catalyst. A white polymer precipitated out of solution after about 5–10 minutes.

Example III 1.46 grams of succinic dihydrazide were dissolved in about 50 ml. of 90 percent ethanol with some heating necessary to effect solution. 0.58 gram of 30 percent aqueous glyoxal were added to the hot solution of succinic dihydrazide. 2 drops of acetic acid were also added as a catalyst. A white precipitate formed which was flocculent and light on drying and melted above 300° C.

As many widely apparently different embodiments of this invention may be made without departing from the spirit and scope thereof, it is to be understood that the same is not to be limited to the specific embodiments thereof except as defined in the appended claims.

I claim:
1. A long chain synthetic polymer composed of recurring structural units of the general formula

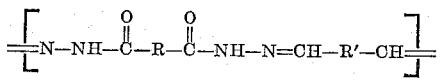

wherein R is a divalent hydrocarbon radical containing from 2 to 12 carbon atoms and R' is selected from the group consisting of a single valence bond and a divalent hydrocarbon radical containing from 1 to 12 carbon atoms, said polymer having a melting point of at least 180° C.

2. A method of producing a long chain synthetic polymer comprising mixing at a temperature of from 30 to 50° C. in the presence of an acid catalyst a solution of a dihydrazide of a dicarboxylic acid having the hydrazide groups attached to a saturated aliphatic hydrocarbon radical containing from 2 to 12 carbon atoms and a solution of a dialdehyde containing from 2 to 14 carbon atoms until a polymeric product is formed having a melting point of at least 180° C., the molecular ratio of dihydrazide to dialdehyde being between 1:1 to 3:1.

3. A method of producing a long chain synthetic polymer comprising mixing at a temperature of from 30 to 50° C. in the presence of an acid catalyst a solution of sebacic dihydrazide and a solution of glutaraldehyde until a polymeric product is formed having a melting point of at least 180° C., the molecular ratio of sebacic dihydrazide to glutaraldehyde being between 2:1 and 3:1.

4. A method of producing a long chain synthetic polymer comprising mixing at a temperature of from 30 to 50° C. in the presence of an acid catalyst a solution of succinic dihydrazide and a solution of glyoxal until a polymeric product is formed having a melting point of at least 180° C., the molecular ratio of succinic dihydrazide to glyoxal being between 2:1 and 3:1.

5. A method of producing a long chain synthetic polymer comprising mixing at a temperature of from 30 to 50° C. in the presence of an acid catalyst a solution of sebacic dihydrazide and a solution of terephthalaldehyde until a polymeric product is formed having a melting point of at least 180° C., the molecular ratio of sebacic dihydrazide to terephthalaldehyde being between 2:1 and 3:1.

6. A method of producing a long chain synthetic polymer comprising mixing at a temperature of from 30 to 50° C. in the presence of an acid catalyst a solution of adipic dihydrazide and a solution of sebacaldehyde until a polymeric product is formed having a melting point of at least 180° C., the molecular ratio of adipic dihydrazide to sebacaldehyde being between 2:1 and 3:1.

7. A method of producing a long chain synthetic polymer comprising mixing at a temperature of from 30 to 50° C. in the presence of an acid catalyst from 50 to 80 percent, based on the total weight of the polymer composition, of a dihydrazide of a dicarboxylic acid having the hydrazide groups attached to a saturated aliphatic hydrocarbon radical containing from 2 to 12 carbon atoms and from 20 to 50 percent, based on the total weight of the polymer composition, of a dialdehyde containing from 2 to 14 carbon atoms, said dihydrazide and said dialdehyde being dissolved in a suitable solvent therefor, until a polymeric product is formed having a melting point of at least 180° C.

8. A method of producing a long chain synthetic polymer comprising mixing at a temperature of from 30 to 50° C. in the presence of an acid catalyst from 60 to 70 percent, based on the total weight of the polymer composition, of a dihydrazide of a dicarboxylic acid having the hydrazide groups attached to a saturated aliphatic hydrocarbon radical containing from 2 to 12 carbon atoms and from 30 to 40 percent, based on the total weight of the polymer composition, of a dialdehyde containing from 2 to 14 carbon atoms, said dihydrazide and said dialdehyde being dissolved in a suitable solvent therefor, until a polymeric product is formed having a melting point of at least 180° C.

9. The method defined in claim 8 wherein the dihydrazide is sebacic dihydrazide and the dialdehyde is glutaraldehyde.

10. The method defined in claim 8 wherein the dihydrazide is sebacic dihydrazide and the dialdehyde is terephthalaldehyde.

11. The method defined in claim 8 wherein the dihydrazide is succinic dihydrazide and the dialdehyde is glyoxal.

12. Polyglutaraldehyde sebacic dihydrazide.
13. Polyglyoxalsuccinic dihydrazide.
14. Polyterephthalaldehyde sebacic dihydrazide.
15. Polysebacaldehyde adipic dihydrazide.

References Cited in the file of this patent
UNITED STATES PATENTS

| | | |
|---|---|---|
| 2,509,183 | Auten | May 23, 1950 |
| 2,574,114 | Lehmann et al. | Nov. 6, 1951 |
| 2,597,467 | Fisher et al. | May 20, 1952 |
| 2,904,389 | Thomas et al. | Sept. 15, 1959 |

FOREIGN PATENTS

| | | |
|---|---|---|
| 506,393 | Great Britain | May 25, 1939 |